US009203778B2

(12) United States Patent
Song et al.

(10) Patent No.: US 9,203,778 B2
(45) Date of Patent: Dec. 1, 2015

(54) DEVICE TO EFFICIENTLY ALLOCATE RESOURCES FOR CLOUD COMPUTING

(71) Applicants: Hyung K. Song, Seoul (KR); You K. Oh, Jellanam-Do (KR); Jeong W. Ji, Seoul (KR); Kyu S. Lee, Incheon (KR)

(72) Inventors: Hyung K. Song, Seoul (KR); You K. Oh, Jellanam-Do (KR); Jeong W. Ji, Seoul (KR); Kyu S. Lee, Incheon (KR)

( * ) Notice: Subject to any disclaimer, the term of this patent is extended or adjusted under 35 U.S.C. 154(b) by 0 days.

(21) Appl. No.: 14/092,344

(22) Filed: Nov. 27, 2013

(65) Prior Publication Data
US 2014/0229621 A1 Aug. 14, 2014

(30) Foreign Application Priority Data

Feb. 13, 2013 (KR) ........................ 10-2013-0015568

(51) Int. Cl.
*G06F 15/173* (2006.01)
*H04L 12/911* (2013.01)
(52) U.S. Cl.
CPC .................................. *H04L 47/822* (2013.01)
(58) Field of Classification Search
CPC ...................................................... H04L 47/70
USPC ........................................................ 709/226
See application file for complete search history.

(56) References Cited

U.S. PATENT DOCUMENTS

| 5,586,219 | A | * | 12/1996 | Yufik | 706/14 |
|---|---|---|---|---|---|
| 6,938,256 | B2 | * | 8/2005 | Deng et al. | 718/104 |
| 2004/0111308 | A1 | * | 6/2004 | Yakov | 705/8 |
| 2006/0053043 | A1 | * | 3/2006 | Clarke | 705/8 |
| 2007/0162584 | A1 | * | 7/2007 | Kokusho et al. | 709/223 |
| 2009/0281858 | A1 | * | 11/2009 | Dorhmi et al. | 705/8 |
| 2010/0115523 | A1 | * | 5/2010 | Kuschel | 718/103 |

FOREIGN PATENT DOCUMENTS

| KR | 20110041194 A | 4/2011 |
|---|---|---|
| KR | 20110059199 A | 6/2011 |
| KR | 20110083176 A | 7/2011 |
| KR | 20110096871 A | 8/2011 |

* cited by examiner

*Primary Examiner* — Ranodhi Serrao
*Assistant Examiner* — Thomas Richardson
(74) *Attorney, Agent, or Firm* — Blank Rome LLP

(57) ABSTRACT

A resource allocation device for cloud computing is disclosed. The resource allocation device may include a resource information collecting unit to collect information on tasks to be processed and resource used for the tasks; and a resource allocation unit to allocate the tasks to the resources using initial value setting and cycle deletion (IVSCD) according to the information so that utility is increased.

20 Claims, 8 Drawing Sheets

DEVICE TO EFFICIENTLY ALLOCATE RESOURCES FOR CLOUD COMPUTING

CROSS-REFERENCE TO RELATED APPLICATION

This application claims the benefit of Korean Patent Application No. 10-2013-0015568, filed on Feb. 13, 2013, in the Korean Intellectual Property Office, the disclosure of which is incorporated herein by reference.

BACKGROUND

1. Field of the Invention

The present invention relates to a device that efficiently allocates resources using initial value setting and cycle deletion (IVSCD) in clouding computing.

2. Description of the Related Art

Cloud computing refers to a computing technology based on a server on the Internet. Cloud services using the technology include three types, that is, infrastructure as a service (IaaS) that provides infrastructure, platform as a service (PaaS) that provides a platform, and software as a service (SaaS) that provides software.

IaaS generally uses a virtualization function but manages virtualized resources virtualized based on physical resources. PaaS provides optimal resources utility and service stability based on resources utilization status of each service and a current status of a cluster system, in an environment hosting and administrating services. The resources herein may refer to a tool assisting computing, data storage, online services, and the like for a user. For example, the resources may include a virtual PC which is a part of a real PC, a real PC, a redundant array of independent disc (RAID), a dedicated server cluster for web hosting, a part of a large scale cluster system, and the like.

Using a cloud service, a user or a company may rent out only necessary computing resources from an expert company when necessary, instead of purchasing computer equipment preparing for a maximum use rate. Such a cloud service includes Amazon elastic cloud, salesforce.com, KT UCloud service, and the like. To this end, researches are being conducted on distribution of the computing resources according to a user demanded environment while increasing utility of the user. This is referred to as a cloud computing resource allocation matter.

Matters related to the cloud computing resource allocation have been widely researched. In the beginning, only distribution of resources for processing a user demanded task used to be studied. However, as time goes by, utility has been studied. The task refers to a unit of work the user intends to process. The task may be modeled to include several subtasks. Time and expense have been mainly considered in researching on increase in the utility of the user. For the researches, it is usually presumed that one resource processes one subtask.

Conventional researches on the matter related to the cloud computing resource allocation may be classified as follows.

First, there are researches for minimizing or maximizing a function having a time or an expense as a parameter. The researches aim at maximizing the utility having the time and the cost as the parameter for cloud resource allocation. In detail, the researches aimed at reduction in time or making an optimal price around an optimal capacity. Similarly, utility is set by making a lowest price, thereby maximizing a gain of the user.

Second, there are researches aiming at optimizing a processing ability and a bandwidth in a circumstance in which an electric power capacity accommodated in each area is limited, and at minimizing total electric power consumption. As another example, the researches may aim at simply meeting user demands or increasing demand elasticity.

Third, there are researches using a game theory. Stackelberg game and Nash equilibrium are used as the game theory.

Other methods are also used for the allocation. Not only a virtual machine but also a second-priced auction mechanism is used for allocation. Besides the Nash equilibrium, a heuristic method such as M/M/1 queuing system and Nash equilibrium based continuous double auction (NECDA) is used. Besides the virtual machine, a elastic application container which is a lightweight resource management model is used for allocation. Also, besides the virtual machine, resource over reservation (ROR) and Vickrey-Clarke-Groves mechanism are used, respectively.

In addition, a provider may provide the user with two allocation plans, that is, a reservation plan and an on-demand plan. An application speed needs to be high to provide the user with a favorable environment. Since the speed is varied according to a position of an application component, a method for providing the position of the application component will be suggested. In addition, resource allocation process with respect to a distributed cloud and a cloud security service in a mobile device will be mainly described.

SUMMARY

An aspect of the present invention provides a device for allocating resources using initial value setting and cycle deletion (IVSCD).

Another aspect of the present invention provides a device for allocating resources irrespective of size of a task.

Yet another aspect of the present invention provides a device for allocating resources by deleting a cycle from an allocation matrix graph.

Still another aspect of the present invention provides device for allocating resources, preventing allocation of resources not satisfying a condition of a task.

According to an aspect of the present invention, there is provided a resource allocation device including a resource information collecting unit to collect information on tasks to be processed and resource used for the tasks, and a resource allocation unit to allocate the tasks to the resources using initial value setting and cycle deletion (IVSCD) according to the information so that utility is increased.

The resource allocation unit may set an initial allocation matrix by mapping the resources and the tasks according to the information collected by the processor, generate a final allocation matrix increased by as much as a sum of utilities from the initial allocation matrix, and allocate the tasks to the resources based on the final allocation matrix.

The resource allocation unit may set the initial allocation matrix by arranging the tasks in an order of a number of subtasks included in each of the tasks.

The resource allocation unit may set the initial allocation matrix so that a number of sharing the resources is minimized.

The resource allocation unit may generate the final allocation matrix that minimizes an expense consumed by the resources while maintaining an execution time for processing the tasks based on the number of sharing the resources.

The resource allocation unit may generate a graph including an edge connecting elements of the initial allocation matrix, and generate the final allocation matrix by performing cycle deletion with respect to the graph.

The resource allocation unit may color the edge with a different color from edge not neighboring edges according to the task.

The information on the resources may include information on a price of each resources including a necessary expense per unit time needed to use the resources.

The resource allocation unit may prevent allocation of a resource not meeting a condition of the task.

The utility may refer to a minimized expense and execution time required for processing the task.

EFFECT

According to embodiments of the present invention, a resource allocation device may efficiently allocate resources based on an allocation matrix according to initial value setting and cycle deletion (IVSCD).

Additionally, according to embodiments of the present invention, a resource allocation device may maintain an execution time by minimizing a number of sharing resources, and may minimize a total expense consumed by resources to complete a task by deleting a graph of an allocation matrix.

Additionally, according to embodiments of the present invention, a resource allocation device may increase total utility according to an increase in a number of users or resources, based on IVSCD.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
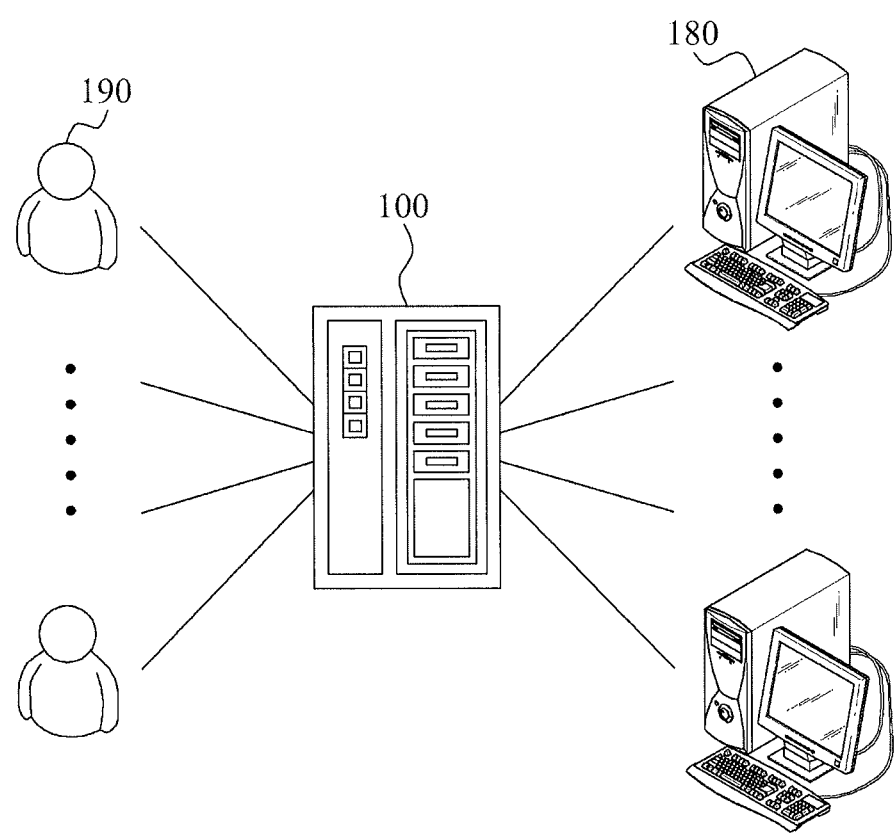
FIG. 1 is a diagram illustrating a configuration of a resource allocation device according to an embodiment of the present invention.

Reference will now be made in detail to exemplary embodiments of the present invention, examples of which are illustrated in the accompanying drawings, wherein like reference numerals refer to the like elements throughout.

FIG. 1 is a diagram illustrating a configuration of a resource allocation device 100 according to an embodiment of the present invention. The resource allocation device may efficiently allocate tasks requested by an n-number of users 190 to an m-number of resources 180. For example, when the m-number of resources 180 are allocated for efficient cloud computing, the resources 180 may include a computer and other terminals connected on a cloud network. However, the description is not limited to resource allocation of a cloud system but may be applied to general resource allocation meeting a particular condition according to the embodiment. According to an embodiment, the resource allocation device 100 may allocate resources irrespective of sizes of the tasks.

Figure 2:
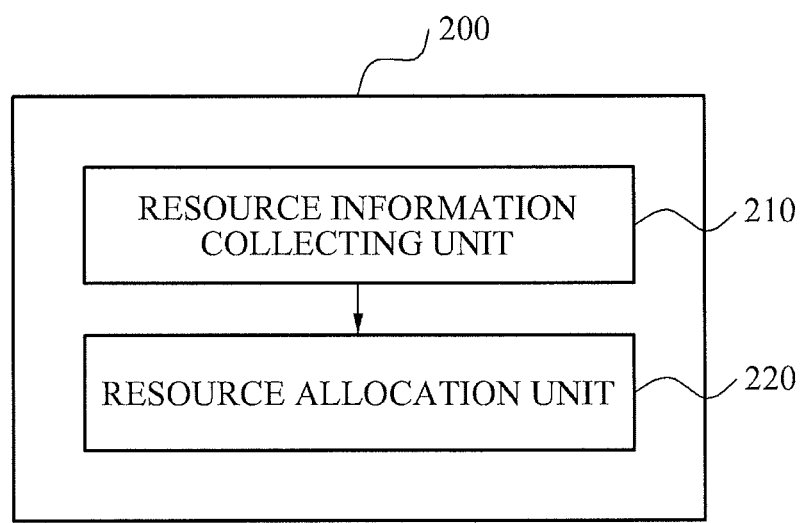
FIG. 2 is a diagram illustrating a configuration of a resource allocation device in detail, according to an embodiment of the present invention.

FIG. 2 is a diagram illustrating a configuration of a resource allocation device 200 in detail, according to an embodiment of the present invention. Here, the resource allocation device 200 may include a resource information collecting unit 210 and a resource allocation unit 220.

The resource information collecting unit 210 may collect a task to be processed, and information on resources used for the task. The information on the task may include a condition necessary for executing the task, a task type, and other information related to the task. The task may be prevented from being allocated to resources not meeting the condition. The information on the resources may also include an expense necessary for using the resources for a unit time period.

The resource allocation unit 220 may allocate the n-number of tasks to the m-number of resources through a processor so that utility is increased using initial value setting and cycle deletion (IVSCD) according to the information collected by the resource information unit 210. Here, n and m may be positive numbers greater than zero.

The resource allocation unit 220 may set an initial allocation matrix by mapping the resources and the tasks according to the information collected by the processor, generate a final allocation matrix increased by as much as a sum of utilities from the initial allocation matrix, and allocate the tasks to the resources based on the final allocation matrix.

The initial allocation matrix may be set by arranging the tasks in order of the number of subtasks included in each of the tasks and by setting the initial allocation matrix so that a number of sharing the resources is minimized.

The final allocation matrix may be generated so that the expense consumed by the resources is minimized while maintaining an execution time of the initial allocation matrix. For example, the execution time required for processing the tasks may be maintained based on the number of sharing the resources. The resource allocation unit 220 may generate the final allocation matrix, by generating a graph including an edge connecting nodes indicating components of the initial allocation matrix, and searching for and deleting a cycle from the graph.

A method for the resource allocation unit 220 of the resource allocation device 200 to allocate the resources will be described in detail later.

Cloud computing resource allocation may refer to allocating tasks demanded by the user to cloud resources and processing the tasks. In the cloud computing resource allocation, an increase in "utility" of the user may be an important matter. The utility indicates a minimized expense and execution time required for processing the task. The utility may be expressed as shown in Equation 8.

In the disclosure, a system model for the above matter is established and the utility is numerically modeled. ALLOC problem for resources allocation may be officially defined.

Since the ALLOC problem is an NP-hard problem, a heuristic solution may be needed. Here, an IVSCD algorithm may be applied, which is devised based on a principle for increasing the user utility deduced from a result of analyzing the ALLOC problem and a solution allocation matrix.

According to an embodiment, one resource may not process only one subtask but use a model that processes a plurality of subtasks. Therefore, the problem may be solved by presuming that one resource may process a plurality of subtasks, thereby increasing the utility of the user. By presuming as aforementioned, different from a conventional method in which one resource processes only one task, the problem may be generalized and solved.

The IVSCD algorithm, which is the heuristic method, is suggested based on the system model. As a result of analyzing the IVSCD method through simulation under the condition that the number of users ranges from 50 to 100, the IVSCD may increase the performance by about 46.58% minimally and by about 93.87% on the average. Results with respect to the various number n of the users the number m of the resources are as shown in FIGS. 3 to 8.

According to the embodiment, the resource allocation algorithm, IVSCD, may be used, which is deduced by devising theorems of Equation 10 to Equation 14 with respect to characteristics of the problem through a systemic access rather than through random or already known algorithms. As a result of the simulation, the performance may be increased by about 93.87%.

According to a conventional method, each resource used to process only one subtask requested by one user. However, according to the embodiment, each resource may process several subtasks. There is a probability that the resources are prevented by the user. The probability that the resources are prevented by the user may include a probability that each resource is incapable of processing the task requested by the user.

The m-number of resources may be properly arranged to process the n-number of tasks. By maximizing the utility by such arrangement, the execution time and the expense may be properly combined and therefore efficiency may be increased. A model that arranges the m-number of resources with respect to the n-number of tasks may be expressed by Equation 1 to Equation 8.

$$R = \{R_1, R_2, \ldots, R_m\}, m \in Z^+$$

$$S = \{S_1, S_2, \ldots, S_n\}, n \in Z^+ \quad \text{[Equation 1]}$$

In Equation 1, R denotes a set of resources, S denotes a set of tasks, and $p_j$ denotes an expense necessary for using a certain resource $R_j (1 \leq j \leq m)$ for a unit time period.

$$b_{ij} \in B(1 \leq i \leq n, 1 \leq j \leq m, b_{ij} \in \{0\} \cup Z^+) \quad \text{[Equation 2]}$$

Equation 2 may express a matrix B of a n×m size. When $b_{ij} \geq 1$ is satisfied with respect to a random element $b_{ij}$, a resource $R_j$ may be allocated to a task $S_i$. When $b_{ij} = 0$, the resource $R_j$ may not be allocated to the task $S_i$.

$$S_i (1 \leq i \leq n) \quad \text{[Equation 3]}$$

In Equation 3, random tasks $S_i$ may each include a $k_i$-number of subtasks. For example, to execute the task $S_i$, the $k_i$-number of subtasks need to be all processed. Calculation amounts required by the subtasks may be all equal.

$$a_{ij} \in A, \sum_{i=1}^{m} a_{ij} = k_i \quad \text{[Equation 4]}$$

In Equation 4, a matrix A of a n×m size may denote an allocation matrix. In the allocation matrix A, each element may denote that a $a_{ij}$-number of subtasks of the task $S_i$ is allocated to the resource $R_j$. Here, $$\sum_{i=1}^{m} a_{ij} = k_i$$

and $(b_{ij}=0) \Rightarrow (a_{ij}=0)$ may be satisfied.

$$e_{ij} \in E(1 \leq i \leq n, 1 \leq j \leq m) \quad \text{[Equation 5]}$$

In Equation 5, a matrix E in the same size as a random allocation matrix A may denote an expense matrix with respect to the allocation matrix A. $e_{ij}$ may denote an expense necessary for processing the task $S_i$ by the resource $R_j$.

$$t_{ij}(1 \leq i \leq n, 1 \leq j \leq m) \quad \text{[Equation 6]}$$

In Equation 6, a matrix T in the same size as a random allocation matrix A may denote an execution time matrix with respect to the allocation matrix A. $t_{ij}$ may denote an execution time necessary for processing the task $S_i$ by the resource $R_j$.

$$\hat{t}_{ij}(1 \leq i \leq n, 1 \leq j \leq m) \quad \text{[Equation 7]}$$

As shown in Equation 7, a matrix $T_0$ of a n×m size may be expressed. Here, an element $\hat{t}_{ij}$ of $T_0$ may denote a time necessary for processing a subtask of the task $S_i$ by the resource $R_j$. For example, relationships between the element $e_{ij}$ of Equation 5 and the element $t_{ij}$ of Equation 6 may be expressed by $$t_{ij} = \sum_{i=1}^{n} a_{ij} \times \hat{t}_{ij}$$

and $e_{ij} = a_{ij} \times p_j \times \hat{t}_{ij}$.

Two random constants $W_e$ and $W_t$ may denote weights with respect to the expense and the execution time, respectively, of when the resource is allocated to the task according to an embodiment. In addition, $f_j$ may denote a probability that each of the resource $R_j$ does not meet a condition required by the user.

$$u_i = \frac{1}{W_t \times \max_{t_{ij} \in t_i} t_{ij} + W_e \times \sum_{i=1}^{m} e_{ij}} \quad \text{[Equation 8]}$$

Equation 8 may express a utility $u_i$ obtainable by an i-th user or task using the expenses the user has to pay and the execution time necessary for the user to complete the desired task. When the task $S_i$ is distributed to a plurality of machines, the entire execution time may be determined by a slowest machine. The entire expense may be a sum of expenses required by the respective machines. Efficient resource allocation for cloud computing, according to the embodiment, may be expressed by a model shown in Equation 8.

Each task $S_i$ may include a $k_i$-number of subtasks. The $k_i$-number of subtasks may be allocated to available resources from $R_1$ to $R_m$. A final allocation result may be expressed by the allocation matrix A. The ALLOC problem may be expressed by Equation 9.

$$\text{Input: } n, m, S_i(1 \le i \le n), k_i(1 \le i \le n), R_j(1 \le j \le m), p_j(1 \le j \le m),$$
$$W_t, W_e, T_0, B, f_j$$

Output: $A$ [Equation 9]

In Equation 9, out of the input, n denotes a number of users, m denotes a number of resources, $S_i$ denotes a task, $k_i$ denotes a number of subtasks included in each task, $R_j$ denotes resource, $p_j$ denotes value information of each resource including an expense required per unit time needed for using each resource, $W_t$ and $W_e$ denotes a weight with respect to the time and the expense, $T_0$ denotes a matrix with respect to the time needed to process one subtask by the resource $R_j$, B denotes a matrix indicating possibility of allocation of each resource to each task, $f_j$ denotes a probability that allocation of the resource $R_j$ is prevented. In Equation 9, elements of the allocation matrix A corresponding to the output may meet Equation 4.

The allocate matrix A, which is the output in Equation 9, may be plural. Comparing A1 and A2 of the plurality of allocation matrices A, it may be understood that a matrix in which a sum of utilities is larger shows higher efficiency of resource allocation. Therefore, with respect to the outputs A1 and A2 with respect to Equation 9, when a sum of utilities of A1 is larger than a sum of utilities of A2, A1 may be considered as a better method than A2.

The ALLOC problem according to the embodiment is a modification to allocate a plurality of subtasks to a prevented resource of a conventional method and to one resource. When allocation of subtasks is limited without using the prevented resource, it is non-deterministic polynomial-time (NP)-hard. Therefore, it is proved that the ALLOC problem according to the embodiment is also NP-hard. Therefore, when an amount of the resources and the users is great, a heuristic algorithm may be used.

The IVSCD algorithm is for finding a solution in which the sum of utilities is larger instead of finding an optimal solution. Theorems necessary to systemically implement the algorithm may be expressed by following equations.

[Equation 10]

When $a_{11}$, $a_{12}$, $a_{21}$, and $a_{22}$ are all positive numbers and a 2×2 allocation matrix $$\begin{bmatrix} a_{11} & a_{12} \\ a_{21} & a_{22} \end{bmatrix}$$

is provided, either of $$\begin{bmatrix} a_{11}-1 & a_{12}+1 \\ a_{21}+1 & a_{22}-1 \end{bmatrix} \text{ and } \begin{bmatrix} a_{11}+1 & a_{12}-1 \\ a_{21}-1 & a_{22}+1 \end{bmatrix}$$

is a better matrix than $$\begin{bmatrix} a_{11} & a_{12} \\ a_{21} & a_{22} \end{bmatrix}.$$

Proof of Equation 10 may be expressed as follows. An execution time matrix of $$\begin{bmatrix} a_{11} & a_{12} \\ a_{21} & a_{22} \end{bmatrix}$$

may be expressed as follows.

$$\begin{bmatrix} \frac{(a_{11}+a_{21})}{a_{11}} \times \hat{t}_{11} \times a_{11} & \frac{(a_{12}+a_{22})}{a_{12}} \times \hat{t}_{12} \times a_{12} \\ \frac{(a_{11}+a_{21})}{a_{21}} \times \hat{t}_{21} \times a_{21} & \frac{(a_{12}+a_{22})}{a_{22}} \times \hat{t}_{22} \times a_{22} \end{bmatrix} =$$

$$\begin{bmatrix} (a_{11}+a_{21}) \times \hat{t}_{11} & (a_{12}+a_{22}) \times \hat{t}_{12} \\ (a_{11}+a_{21}) \times \hat{t}_{21} & (a_{12}+a_{22}) \times \hat{t}_{22} \end{bmatrix}$$

An expense matrix obtained by multiplying the above execution time matrix by the expense may be expressed as follows.

$$\begin{bmatrix} (a_{11}+a_{21}) \times \hat{t}_{11} \times \frac{a_{11}}{(a_{11}+a_{21})} p_1 & (a_{12}+a_{22}) \times \hat{t}_{12} \times \frac{a_{12}}{(a_{12}+a_{22})} p_2 \\ (a_{11}+a_{21}) \times \hat{t}_{21} \times \frac{a_{21}}{(a_{11}+a_{21})} p_1 & (a_{12}+a_{22}) \times \hat{t}_{22} \times \frac{a_{22}}{(a_{12}+a_{22})} p_2 \end{bmatrix}$$

When the above expense matrix is $$\begin{bmatrix} a & b \\ c & d \end{bmatrix},$$

utility values of respective resources may be expressed as follows according to Equation 8.

$$u_1 = \frac{1}{a+b+\max\{(a_{11}+a_{21})\hat{t}_{11}, (a_{12}+a_{22})\hat{t}_{12}\}},$$

$$u_2 = \frac{1}{c+d+\max\{(a_{11}+a_{21})\hat{t}_{11}, (a_{12}+a_{22})\hat{t}_{12}\}}$$

Next, the execution time matrix with respect to $$\begin{bmatrix} a_{11}-1 & a_{12}+1 \\ a_{21}+1 & a_{22}-1 \end{bmatrix}$$

may be expressed as follows.

$$\begin{bmatrix} \frac{(a_{11}+a_{21})}{(a_{11}-1)} \times \hat{t}_{11} \times (a_{11}-1) & \frac{(a_{12}+a_{22})}{(a_{12}+1)} \times \hat{t}_{12} \times (a_{12}+1) \\ \frac{(a_{11}+a_{21})}{(a_{21}+1)} \times \hat{t}_{21} \times (a_{21}+1) & \frac{(a_{12}+a_{22})}{(a_{22}-1)} \times \hat{t}_{22} \times (a_{22}-1) \end{bmatrix} =$$

$$\begin{bmatrix} (a_{11}+a_{21}) \times \hat{t}_{11} & (a_{12}+a_{22}) \times \hat{t}_{12} \\ (a_{11}+a_{21}) \times \hat{t}_{21} & (a_{12}+a_{22}) \times \hat{t}_{22} \end{bmatrix}$$

Here, the expense matrix with respect to the execution time matrix may be calculated as follows according to Equation 5.

$$\begin{bmatrix} (a_{11}+a_{21})\times \hat{t}_{11} \times \frac{(a_{11}-1)}{(a_{11}+a_{21})}p_1 & (a_{12}+a_{22})\times \hat{t}_{12} \times \frac{(a_{21}-1)}{(a_{12}+a_{22})}p_2 \\ (a_{11}+a_{21})\times \hat{t}_{21} \times \frac{(a_{21}-1)}{(a_{11}+a_{21})}p_1 & (a_{12}+a_{22})\times \hat{t}_{22} \times \frac{(a_{12}-1)}{(a_{12}+a_{22})}p_2 \end{bmatrix}$$

The expense matrix may be expressed as $$\begin{bmatrix} a - p_1\hat{t}_{11} & b + p_2\hat{t}_{12} \\ c + p_1\hat{t}_{21} & d - p_2\hat{t}_{22} \end{bmatrix}$$

using a, b, c, and d. A utility u' of this case may be expressed as follows.

$$u'_1 = \frac{1}{a - p_1\hat{t}_{11} + b + p_2\hat{t}_{12} + \max\{(a_{11}+a_{21})\hat{t}_{11}, (a_{12}+a_{22})\hat{t}_{12}\}}$$

$$u'_2 = \frac{1}{c + p_1\hat{t}_{21} + d - p_2\hat{t}_{22} + \max\{(a_{11}+a_{21})\hat{t}_{21}, (a_{12}+a_{22})\hat{t}_{22}\}}$$

Since an expense matrix of another allocation matrix $$\begin{bmatrix} a_{11}+1 & a_{12}-1 \\ a_{21}-1 & a_{22}+1 \end{bmatrix} \text{ is } \begin{bmatrix} a + p_1\hat{t}_{11} & b - p_2\hat{t}_{12} \\ c - p_1\hat{t}_{21} & d + p_2\hat{t}_{22} \end{bmatrix},$$

a utility u" of this case may be expressed as follows.

$$u''_1 = \frac{1}{a + p_1\hat{t}_{11} + b - p_2\hat{t}_{12} + \max\{(a_{11}+a_{21})\hat{t}_{11}, (a_{12}+a_{22})\hat{t}_{12}\}}$$

$$u''_2 = \frac{1}{c - p_1\hat{t}_{21} + d + p_2\hat{t}_{22} + \max\{(a_{11}+a_{21})\hat{t}_{21}, (a_{12}+a_{22})\hat{t}_{22}\}}$$

Among the above utilities, a utility with respect to a first user may be expressed as follows.

$$a+b+\max\{(a_{11}+a_{21})\hat{t}_{11},(a_{12}+a_{22})\hat{t}_{12}\}=A, a-p_1\hat{t}_{11}+b+p_2\hat{t}_{12}+\max\{(a_{11}+a_{21})\hat{t}_{11},(a_{12}+a_{22})\hat{t}_{12}\}=B$$

Here, each utility with respect to the first user may be expressed as $$u'_1 + u''_1 = \frac{1}{B} + \frac{1}{2A-B} = \frac{2A}{B(2A-B)}.$$

A following relationship may be established through arithmetical unequality.

$$u'_1 + u''_1 = \frac{2A}{B(2A-B)} \geq \frac{2A}{A^2} = \frac{2}{A} = 2u_1$$

Accordingly, $u'_2+u''_2 \geq 2u_2$ may be concluded and, therefore, $(u'_1+u'_2)+(u''_1+u''_2) \geq 2u_1+2u_2$ may be concluded by combining two equations with respect to the first user and the second user. For example, either of $u'_1+u'_2$ and $u''_1+u''_2$ may be greater than or equal to $u_1+u_2$.

As a result, a utility of either of $$\begin{bmatrix} a_{11}-1 & a_{12}+1 \\ a_{21}+1 & a_{22}-1 \end{bmatrix} \text{ and } \begin{bmatrix} a_{11}+1 & a_{12}-1 \\ a_{21}-1 & a_{22}+1 \end{bmatrix}$$

may be higher than a utility of $$\begin{bmatrix} a_{11} & a_{12} \\ a_{21} & a_{22} \end{bmatrix}.$$

[Equation 11]

When an n×m allocation matrix A', which is the solution of the ALLOC problem, and a 2×2 submatrix $$\begin{bmatrix} a_{ij} & a_{i(j+1)} \\ a_{(i+1)j} & a_{(i+1)(j+1)} \end{bmatrix}(a_{ij}, a_{i(j+1)}, a_{(i+1)j}, a_{(i+1)(j+1)} \geq 1)$$

of A' are provided, either of two matrices $$\begin{bmatrix} a_{ij}-1 & a_{i(j+1)}+1 \\ a_{(i+1)j}+1 & a_{(i+1)(j+1)}-1 \end{bmatrix} \text{ and } \begin{bmatrix} a_{ij}+1 & a_{i(j+1)}-1 \\ a_{(i+1)j}-1 & a_{(i+1)(j+1)}+1 \end{bmatrix}$$

obtained by transposition of the submatrix may have a higher utility than a utility of a matrix of before transposition.

To prove the theorem of Equation 11, the allocation matrix A may be set as follows.

$$\begin{bmatrix} a_{11} & a_{12} & & & & a_{1m} \\ a_{21} & \ddots & & & & \\ & & a_{ij} & a_{i(j+1)} & & \\ \vdots & & a_{(i+1)j} & a_{(i+1)(j+1)} & & \\ & & & & \ddots & \\ a_{n1} & & & & & a_{nm} \end{bmatrix}$$

In two rows including $a_{ij}$, $a_{i(j+1)}$, $a_{(i+1)j}$ and $a_{(i+1)(j+1)}$, sums of expenses and maximum times of remaining tasks excluding $a_{ij}$, $a_{i(j+1)}$, $a_{(i+1)j}$ and $a_{(i+1)(j+1)}$, may be expressed by α, β, $\max(t_\alpha)$, and $\max(t_\beta)$, respectively. In a column including $a_{ij}$ and $a_{(i+1)j}$, a number of tasks including $a_{ij}$ and $a_{(i+1)j}$ may be presumed to be x. In a column including $a_{i(j+1)}$ and $a_{(i+1)(j+1)}$, a number of tasks including $a_{(i+1)(j+1)}$ may be presumed to be y.

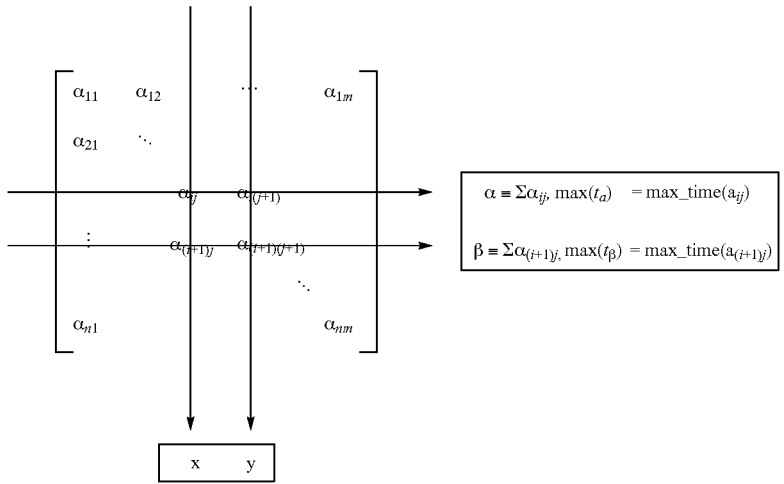

The execution time matrix may be expressed as follows.

$$\begin{bmatrix} t_{11} & t_{12} & & & \cdots & & t_{1m} \\ t_{21} & \ddots & & & & & \\ & & \frac{x}{a_{ij}} \times \hat{t}_{ij} \times a_{ij} & \frac{y}{a_{i(j+1)}} \times \hat{t}_{i(j+1)} \times a_{i(j+1)} & & & \\ \vdots & & \frac{x}{a_{(i+1)j}} \times \hat{t}_{(i+1)j} \times a_{(i+1)j} & \frac{y}{a_{(i+1)(j+1)}} \times \hat{t}_{(i+1)(j+1)} \times a_{(i+1)(j+1)} & & & \\ & & & & & \ddots & \\ t_{n1} & & & & & & t_{nm} \end{bmatrix}$$

Similar to the method of Equation 10, the execution time matrix may be converted into the expense matrix as follows.

$$\begin{bmatrix} e_{11} & e_{12} & & & \cdots & & e_{1m} \\ e_{21} & \ddots & & & & & \\ & & x \times \hat{t}_{ij} \times \frac{a_{ij}}{x} p_j & y \times \hat{t}_{i(j+1)} \times \frac{a_{(i+1)j}}{y} + p_{j+1} & & & \\ \vdots & & x \times \hat{t}_{(i+1)j} \times \frac{a_{(i+1)j}}{x} p_j & y \times \hat{t}_{(i+1)(j+1)} \times \frac{a_{(i+1)(j+1)}}{y} p_{j+1} & & & \\ & & & & & \ddots & \\ e_{n1} & & & & & & e_{nm} \end{bmatrix}$$

Similar to the process of proving Equation 10, a, b, c, and d may be used as follows.

$$\begin{bmatrix} e_{11} & e_{12} & \cdots & e_{1m} \\ e_{21} & \ddots & & \\ & & a & b \\ \vdots & & c & d \\ & & & & \ddots \\ e_{n1} & & & e_{nm} \end{bmatrix}$$

The utility with respect to each user from the matrix substituted by a, b, c, and d may be expressed as follows.

$$u_1 = \frac{1}{\alpha + a + b + \max\{x\hat{t}_{ij}, y\hat{t}_{i(j+1)}, \max t_\alpha\}},$$

$$u_2 = \frac{1}{\beta + c + d + \max\{x\hat{t}_{(i+1)j}, y\hat{t}_{(i+1)(j+1)}, \max t_\beta\}}$$

Similar to Equation 10, $$\begin{bmatrix} a_{ij} & a_{i(j+1)} \\ a_{(i+1)j} & a_{(i+1)(j+1)} \end{bmatrix}$$

may be substituted by $$\begin{bmatrix} a_{ij}-1 & a_{i(j+1)}+1 \\ a_{(i+1)j}+1 & a_{(i+1)(j+1)}-1 \end{bmatrix} \text{ and}$$

$$\begin{bmatrix} a_{ij}+1 & a_{i(j+1)}-1 \\ a_{(i+1)j}-1 & a_{(i+1)(j+1)}+1 \end{bmatrix}.$$

For example, the expense matrix with respect to $$\begin{bmatrix} a_{ij}-1 & a_{i(j+1)}+1 \\ a_{(i+1)j}+1 & a_{(i+1)(j+1)}-1 \end{bmatrix}$$

may be expressed as follows.

$$\begin{bmatrix} e_{11} & e_{12} & & \cdots & & e_{1m} \\ e_{21} & \ddots & & & & \\ & & (a_{ij}-1)\times \hat{t}_{ij}\times p_j & (a_{i(j+1)}-1)\times \hat{t}_{i(j+1)}\times p_{j+1} & & \\ \vdots & & (a_{(i+1)j}+1)\times \hat{t}_{(i+1)j}\times p_j & (a_{(i+1)(j+1)}-1)\times \hat{t}_{(i+1)(j+1)}\times p_{j+1} & & \\ & & & & \ddots & \\ e_{n1} & & & & & e_{nm} \end{bmatrix}$$

The expense matrix may be rearranged using a, b, c, and d.

$$\begin{bmatrix} e_{11} & e_{12} & & \cdots & & e_{1m} \\ e_{21} & \ddots & & & & \\ & & a-\hat{t}_{ij}\times p_j & b+\hat{t}_{i(j+1)}\times p_{j+1} & & \\ \vdots & & c+\hat{t}_{(i+1)j}\times p_j & d-\hat{t}_{(i+1)(j+1)}\times p_{j+1} & & \\ & & & & \ddots & \\ e_{n1} & & & & & e_{nm} \end{bmatrix}$$

The utility u' with respect to each user may be expressed as follows.

$$u'_1 = \frac{1}{\alpha+a+b-\hat{t}_{ii}\times p_i+\hat{t}_{i(i+1)}\times p_{i+1}+\max\{x\hat{t}_{ii}, y\hat{t}_{i(i+1)}, \max t_\alpha\}}$$

$$u'_2 = \frac{1}{\beta+c+d+t_{(i+1)j}\times p_j-t_{(i+1)(j+1)}\times p_{j+1}+\max\{x\hat{t}_{(i+1)j}, y\hat{t}_{(i+1)(j+1)}, \max t_\beta\}}$$

As another example, a utility of $$\begin{bmatrix} a_{ij}+1 & a_{i(j+1)}-1 \\ a_{(i+1)j}+1 & a_{(i+1)(j+1)}+1 \end{bmatrix}$$

may be expressed as follows.

$$u''_1 = \frac{1}{\alpha+a+b+\hat{t}_{ij}\times p_j-\hat{t}_{i(j+1)}\times p_{j+1}+\max\{x\hat{t}_{ij}, y\hat{t}_{i(j+1)}, \max t_\alpha\}}$$

$$u''_2 = \frac{1}{\beta+c+d-t_{(i+1)j}\times p_j+t_{(i+1)(j+1)}\times p_{j+1}+\max\{x\hat{t}_{(i+1)j}, y\hat{t}_{(i+1)(j+1)}, \max t_\beta\}}$$

Here, when $\alpha+a+b+\max\{x\hat{t}_{ij}, y\hat{t}_{i(j+1)}, \max t_\alpha\}=A$ and $\alpha+a+b+\hat{t}_{ij}\times p_j-\hat{t}_{i(j+1)}\times p_{j+1}+\max\{x\hat{t}_{ij}, y\hat{t}_{i(j+1)}, \max t_\alpha\}=B$ are satisfied, $$u'_1+u''_1 = \frac{1}{B}+\frac{1}{2A-B} \geq \frac{2}{A} = 2u_1$$

may be concluded from Equation 10. Accordingly, since $u'_2+u''_2 \geq 2u_2$ is satisfied, $(u'_1+u'_2)+(u''_1+u''_2) \geq 2(u_1+u_2)$ may be concluded by combining two equations. For example, at least one of $(u'_1+u'_2)$ and $(u''_1+u''_2)$ may be greater than or equal to $(u_1+u_2)$. In addition, since remaining elements of the allocation matrix, excluding $a_{ij}$, $a_{i(j+1)}$, $a_{(i+1)j}$ and $a_{(i+1)(j+1)}$, are not changed in the utility, finally, a sum of utilities of a matrix substituted by $$\begin{bmatrix} a_{ij}-1 & a_{i(j+1)}+1 \\ a_{(i+1)j}+1 & a_{(i+1)(j+1)}-1 \end{bmatrix} \text{ or}$$

$$\begin{bmatrix} a_{ij}+1 & a_{i(j+1)}-1 \\ a_{(i+1)j}-1 & a_{(i+1)(j+1)}+1 \end{bmatrix}$$

may be increased larger than a sum of utilities of a matrix including $$\begin{bmatrix} a_{ij} & a_{i(j+1)} \\ a_{(i+1)j} & a_{(i+1)(j+1)} \end{bmatrix}.$$

When there is a solution $$A = \begin{bmatrix} a_1 & b_1 & \cdots & \\ \vdots & a_2 & b_2 & \\ \vdots & & \ddots & \\ b_n & & & a_n \end{bmatrix} \quad \text{[Equation 12]}$$

(step type), and min(a) is smallest among $a_i$ and min(b) is smallest among $b_i$, either of $$\begin{bmatrix} a_1 - \min(a) & b_1 + \min(a) & \cdots & \\ \vdots & a_2 - \min(a) & b_2 + \min(a) & \\ \vdots & & \ddots & \\ b_n + \min(a) & & & a_n - \min(a) \end{bmatrix}$$ and $$\begin{bmatrix} a_1 + \min(b) & b_1 - \min(b) & \cdots & \\ \vdots & a_2 + \min(b) & b_2 - \min(b) & \\ \vdots & & \ddots & \\ b_n - \min(b) & & & a_n + \min(b) \end{bmatrix}$$

is a better matrix than A.

To prove the theorem of Equation 12, a sum of a number of subtasks of an i-th column of $$\begin{bmatrix} a_1 & b_1 & \cdots \\ \vdots & a_2 & b_2 \\ \vdots & & \ddots \\ b_n & & a_n \end{bmatrix}$$

may be expressed by $x_i$. In addition, a sum of expenses and an execution time of remaining tasks excluding $a_i$ and $b_i$ from rows including $a_i$ and $b_i$ may be expressed as $\alpha_i$ and max(t($\alpha_i$)), respectively.

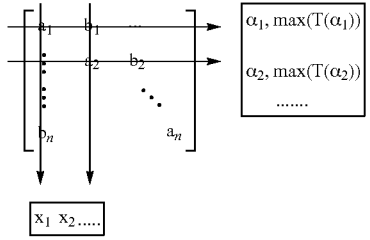

Similar to Equation 10 and Equation 11, the execution time matrix may be expressed as follows.

$$\begin{bmatrix} x_1 \times \hat{t}_{11} & x_2 \times \hat{t}_{12} & \cdots & \\ \vdots & x_2 \times \hat{t}_{22} & x_3 \times \hat{t}_{23} & \\ \vdots & & \ddots & \\ x_1 \times \hat{t}_{n1} & & & x_n \times \hat{t}_{nn} \end{bmatrix}$$

The expense matrix with respect to the execution time matrix may be expressed as follows.

$$\begin{bmatrix} a_1 \times \hat{t}_{11} \times p_1 & b_1 \times \hat{t}_{12} \times p_2 & \cdots & \\ \vdots & a_2 \times \hat{t}_{22} \times p_2 & b_2 \times \hat{t}_{23} \times p_3 & \\ \vdots & & \ddots & \\ b_n \times \hat{t}_{n1} \times p_1 & & & a_n \times \hat{t}_{nn} \times p_n \end{bmatrix}$$

The utility $u_1$ with respect to each user may be calculated as follows. When i is n, i+1 may be calculated as 1.

$$u_i = \frac{1}{a_i \times \hat{t}_{ii} \times p_i + b_i \times \hat{t}_{i(i+1)} \times p_{i+1} + \alpha_i + \max\{x_i \times \hat{t}_{ii}, x_{i+1} \times \hat{t}_{i(i+1)}, \max(T(\alpha_i))\}}$$

For example, the execution time matrix with respect to $$\begin{bmatrix} a_1 - \min(a) & b_1 + \min(a) & \cdots & \\ \vdots & a_2 - \min(a) & b_2 + \min(a) & \\ \vdots & & \ddots & \\ b_n + \min(a) & & & a_n - \min(a) \end{bmatrix}$$

may be $$\begin{bmatrix} x_1 \times \hat{t}_{11} & x_2 \times \hat{t}_{12} & \cdots & \\ \vdots & x_2 \times \hat{t}_{22} & x_3 \times \hat{t}_{23} & \\ \vdots & & \ddots & \\ x_1 \times \hat{t}_{n1} & & & x_n \times \hat{t}_{nn} \end{bmatrix}.$$

The expense matrix with respect to the execution time matrix may be expressed as follows.

$$\begin{bmatrix} (a_1 - \min(a)) \times \hat{t}_{11} \times p_1 & (b_1 + \min(a)) \times \hat{t}_{12} \times p_2 & \cdots & \\ \vdots & (a_2 - \min(a)) \times \hat{t}_{22} \times p_2 & (b_2 + \min(a)) \times \hat{t}_{23} \times p_3 & \\ \vdots & & \ddots & \\ (b_n + \min(a)) \times \hat{t}_{n1} \times p_1 & & & (a_n + \min(a)) \times \hat{t}_{nn} \times p_n \end{bmatrix}$$

Here, a utility $u'_i$ may be expressed as follows.

$$u'_i = \frac{1}{a_i \times \hat{t}_{ii} \times p_i - \min(a) \times \hat{t}_{ii} \times p_i + b_i \times \hat{t}_{i(i+1)} \times p_{i+1} + \min(a) \times \hat{t}_{i(i+1)} \times p_{i+1} + \alpha_i + \max\{x_i \times \hat{t}_{ii}, x_{i+1} \times \hat{t}_{i(i+1)}, \max(T(\alpha_i))\}}$$

As another example, a utility $u''_i$ with respect to $$\begin{bmatrix} a_1 + \min(b) & b_1 - \min(b) & \cdots & \\ \vdots & a_2 + \min(b) & b_2 - \min(b) & \\ \vdots & & \ddots & \\ b_n - \min(b) & & & a_n + \min(b) \end{bmatrix}$$

may be expressed as follows.

$$u''_i = \frac{1}{a_i \times \hat{t}_{ii} \times p_i + \min(b) \times \hat{t}_{ii} \times p_i + b_i \times \hat{t}_{i(i+1)} \times p_{i+1} - \min(b) \times \hat{t}_{i(i+1)} \times p_{i+1} + \alpha_i + \max\{x_i \times \hat{t}_{ii}, x_{i+1} \times \hat{t}_{i(i+1)}, \max(T(\alpha_i))\}}$$

Here, when $a_i \times \hat{t}_{ii} \times p_i + b_i \times \hat{t}_{i(i+1)} \times p_{i+1} + \alpha_i + \max\{x_i \times \hat{t}_{ii}, x_{i+1} \times \hat{t}_{i(i+1)}, \max(T(\alpha_i))\} = A_i$ and $a_i \times \hat{t}_{ii} \times p_i - \min(a) \times \hat{t}_{ii} \times p_i + b_i \times \hat{t}_{i(i+1)} \times p_{i+1} + \min(a) \times \hat{t}_{i(i+1)} \times p_{i+1} + \alpha_i + \max\{x_i \times \hat{t}_{ii}, x_{i+1} \times \hat{t}_{i(i+1)}, \max(T(\alpha_i))\} = B_i$ are satisfied, $$u'_i + u''_i = \frac{1}{B_i} + \frac{1}{2A_i - B_i} \geq \frac{2}{A_i}$$
$$= 2u_i$$

and $$\sum_{i=1}^{n} u'_i + u''_i \geq 2 \sum_{i=1}^{n} u_i$$

may be concluded.

Since $$\sum_{i=1}^{n} u'_i$$

or $$\sum_{i=1}^{n} u''_i$$

may be higher than $$\sum_{i=1}^{n} u_i,$$

either of $$\begin{bmatrix} a_1 - \min(a) & b_1 + \min(a) & \cdots & \\ \vdots & a_2 - \min(a) & b_2 + \min(a) & \\ \vdots & & \ddots & \\ b_n + \min(a) & & & a_n - \min(a) \end{bmatrix}$$

and $$\begin{bmatrix} a_1 + \min(b) & b_1 - \min(b) & \cdots & \\ \vdots & a_2 + \min(b) & b_2 - \min(b) & \\ \vdots & & \ddots & \\ b_n - \min(b) & & & a_n + \min(b) \end{bmatrix}$$

may be a better matrix than $$\begin{bmatrix} a_1 & b_1 & \cdots & \\ \vdots & a_2 & b_2 & \\ \vdots & & \ddots & \\ b_n & & & a_n \end{bmatrix}.$$

[Equation 13]

A y-coordinate of each element may be defined as $y(k)$ and an x-coordinate of each element may be defined as $x(k)$. In a matrix A, it is presumed that there are $b_1, b_2, \ldots, b_n, c_1, c_2, \ldots,$ and $c_n$ satisfying $y(a_{b1})=y(a_{c1})$, $x(a_{c1})=x(a_{b2})$, $y(a_{b2})=y(a_{c2}), \ldots$. When $m_1$ denotes a minimum value of $a_{b1}$, $m_2$ denotes a minimum value of $a_{c1}$, a matrix $B=a_{ij}-m_1$ (when $(i,j) \in b$), $a_{ij}+m_1$ (when $(i,j) \in c$), $a_{ij}$(else), and a matrix $C=a_{ij}+m_2$ (when $(i,j) \in b$) $a_{ij}-m_2$ (when $(i,j) \in c$), $a_{ij}$ (else), either of B and C may be a better matrix than A.

To prove Equation 13, the allocation matrix A may be set as follows.

$$\begin{bmatrix} a_{11} & a_{12} & & \cdots & & a_{1m} \\ a_{21} & \ddots & & & & \\ & & a_{ij} & a_{i(j+1)} & & \\ \vdots & & & a_{(i+1)j} & a_{(i+1)(j+1)} & \\ & & & & \ddots & \\ a_{n1} & & & & & a_{nm} \end{bmatrix} \rightarrow \begin{bmatrix} U_1 \\ U_2 \end{bmatrix}$$

Here, rows may be denoted by $U_1, U_2, \ldots U_n$. Therefore, even when the row is changed in the allocation matrix A, the number of users, the number of resources, and demands of the users are not changed. Therefore, the row may be changed. For example, the rows may be rearranged in a random order such as $U_3, U_1, U_{64}, \ldots$ instead of $U_1, U_2, \ldots U_n$. when the allocation matrix A have $b_1, b_2, \ldots, b_n, c_1, c_2, \ldots,$ and $c_n$ satisfying $y(a_{b1})=y(a_{c1}), x(a_{c1})=x(a_{b2}), y(a_{b2})=y(a_{c2}), \ldots$, the allocation matrix A may be turned into the matrix shown in Equation 12 by changing the rows. Accordingly, the matrix A becomes equivalent to the matrix of Equation 12, Equation 13 may be proved through the foregoing proof related to Equation 12.

[Equation 14]

A minimum j meeting $A_{ij}>0$ with respect to the i-th row of the allocation matrix A is defined as $R_i$. A number of vertices for generating a graph $G=(V, E)$ is m. When $j>R_i$ is met with respect to $(i, j)$ meeting $A_{ij}>0$, $(R_i, j)$ edge is generated. The edge is colored with a color i.

In the graph G, existence of cycles and existence of $b_1, b_2, \ldots, b_n, c_1, c_2, \ldots,$ and $c_n$ satisfying $y(a_{b1})=y(a_{c1}), x(a_{c1})=x(a_{b2}), y(a_{b2})=y(a_{c2}), \ldots$ are a necessary and sufficient condition.

To prove the necessary and sufficient condition of Equation 14, a necessary condition and a sufficient condition may be proved as follows.

First, to prove the necessary condition, it may be presumed that $b_1, b_2, \ldots, b_n, c_1, c_2, \ldots,$ and $c_n$ satisfying $y(a_{b1})=y(a_{c1}), x(a_{c1})=x(a_{b2}), y(a_{b2})=y(a_{c2}), \ldots$ are present. For example, since $y(a_{bi})=y(a_{ci})$ with respect to a random i, there is a way from $x(a_{bi})$ to $x(a_{ci})$ in the graph G. However, since $x(a_{ci})=x(a_{b(i+1)})$ there may be a way from $x(a_{bi})$ to $x(a_{b(i+1)})$. As a result, a cycle $x(a_{b1}) \rightarrow x(a_{b2}) \rightarrow x(a_{b3}) \rightarrow \ldots \rightarrow x(a_{bn}) \rightarrow x(a_{b1})$ may be present in the graph G. The cycle may refer to a closed curve figure showing on a graph connecting nodes by edges, considering elements of the matrix as the nodes.

Next, to prove the sufficient condition, it may be presumed that a cycle C is present in the graph G. C may refer to a cycle of which nodes are $v_1 \to v_2 \to \ldots \to v_k \to v_1$ ($v_i \neq v_j$ for $\forall i, j\ i \neq j$). An edge of $v_i \to v_{i+1}$ may be expressed as $e_i$. For example, the cycle C may be expressed as $e_1 \to e_2 \to \ldots \to e_k \to e_1$. Not neighboring edges may be marked with different colors. When not neighboring edges $e_i$ and $e_j$ are colored with a same color c, a node Re shows at least twice on the cycle, which contradicts the presumption.

Next, $b_1, b_2, \ldots, b_n, c_1, c_2, \ldots$, and $c_n$ satisfying $y(a_{b1})=y(a_{c1}), x(a_{c1})=x(a_{b2}), y(a_{b2})=y(a_{c2}), \ldots$ may be generated from the cycle C. According to a method for the generation, when color($e_i$)≠color($e_{i+1}$) with respect to $e_i$, $e_{i+1}$ (i=1, 2, 3, ..., k), (color($e_i$), $v_{i+1}$) may be added to a sequence b and (color($e_{i+1}$), $v_{i+1}$) may be added to a sequence c. Thus generated sequences b and c may satisfy $y(a_{b1})=y(a_{c1})$, $x(a_{c1})=x(a_{b2}), y(a_{b2})=y(a_{c2}), \ldots$. Accordingly, the two conditions are proved to be necessary and sufficient.

The resource allocation device for cloud computing, according to the embodiment, may use the IVSCD which is the heuristic algorithm based on the system model and analysis according to Equation 1 to Equation 14. Here, the IVSCD algorithm may be divided into two parts, that is, init_alloc and Cycle deletion.

init_alloc may set an initial allocation matrix. Since the execution time may be dependent on max $\{t_{ij}\}$ according to Equation 8, in a final allocation matrix $A^f$ which is a potential solution for the ALLOC problem, the execution time may be evenly distributed. However, before the execution time becomes even, a number of sharing the resource may be minimized. The number of sharings may correspond to the number of subtasks allocated to the resources.

An initial allocation matrix $A_O$ may be established in the following manner. 1) When the number of subtasks are arranged in order of $k_1 \geq k_2 \geq \ldots \geq k_n$, and 2) a current number of sharing of $R_j$ with respect to $k_i$ ($1 \leq i \leq n$) is $H_j$, $a_{ij}$ is filled in an increasing order of $H_j$. When H values are equal ($H_k=H_l$) and $\hat{t}_k \leq \hat{t}_l$, $a_{ik}$ may be filled first. When $\hat{t}_k > \hat{t}_l$, $a_{il}$ may be filled first. Whenever $a_{ik}$ is filled, $H_x$ may be updated. The above process may be expressed by pseudo code as in Table 1.

TABLE 1

Def init_alloc:
int o[n], i, j, H[m];
set $A_{ij=0}$ for 1<=i=n, i<=j<=m
set $H_j$=0 for 1<=j<=m
set $o_i$=I for 1<=i<=n
sort o s.t. $k_{o[i]}$>=$k_{o[j]}$ when i<=j
for i=1 to n, do
    S=∅
    S←(j s.t. $B_{o[i]j}$=1 and 1<=j<=m)
    x←o[i]
    repeat $k_x$ times do
        select h∈s s.t. ($H_{[h]}<H_{[h']}$ or ($H_{[h]}<H_{[h']}$ and $T_{xh}<=T_{xh'}$)
        for h'∈s)
        $H_{[h]}$++
        $A_{xh}$++
    end repeat
end for In Cycle deletion, the cycle may be deleted. An expense may not be taken into consideration with respect to the initial allocation matrix $A_O$ completed in init_alloc. Since the execution time is minimized in init_alloc, Cycle deletion for reducing the expense may be performed under the condition that the execution time of $A_O$ is not increased.

In detail, the final allocation matrix $A^f$ that minimizes the expenses while not increasing the execution time of $A_O$ may be generated as follows. 1) The graph is initialized. 2) Locations in which a number other than zero first appears in the i-th row of the matrix A with respect to all (1≤i≤n) are found and stored in $R_j$. 3) ($R_i$, j) is added to the edge with respect to all (i, j) ($A_{ij} \neq 0$) and the node may be set to node={1, ..., m}. 4) The cycle is searched for and when the cycle is absent, a process 9) of Cycle deletion may be performed. 5) When the cycle is found, a series related to the node of the cycle may be expressed as V and a series related to the edge may be expressed as E. 6) A point (row($E_{i-1}$),$V_i$) may be added to RED and a point (row($E_i$),$V_i$) may be added to BLUE with respect to all $V_i$ satisfying row($E_{i-1}$)≠row($E_i$). 7) $A'_{ij}$ may allocate $A_{ij}-\min_R$(when (i,j)∈RED), $A_{ij}+\min_B$(when (i,j)∈BLUE), and $A_{ij}$(when other). 8) When A<A', A is set to A' and 1) of Cycle deletion may be performed and, when A>A', Aij= ... and then 1) of Cycle deletion may be performed. Finally, 9) A return may be performed. The pseudo code with respect to the Cycle deletion may be expressed as shown in Table 2.

TABLE 2

Def cycle_deletion:
int i, j;
int R[n];
while, (true) {
    E=∅, CN=∅, CE=∅
    $V_i$=0 for 1<=i<=m
    index of first positive number on row i in
    $R_i$←matrixA for 1<=i<=n
    for i=1 to n do
        for j=$R_i$+1 to m do
            E←($R_i$,j) if $A_{i,j} \neq 0$
        end for
    end for
    if there is no cycle, break;
    CN←nodes of cycle
    CE←edges of cycle
    CC←# of nodes
    for i=1 to CC do
        if row($CE_{i-1}$) !=row($CE_i$)
            Red←Red append (row($CE_{i-1}$), $CN_i$)
            Blue←Blue append (row($CE_i$), $CN_i$)
        end if
    end for
    org_util=Σ utility of A
    $\min_R$=min.val of $A_e$ for all e∈RED
    $\min_B$=min.val of $A_e$ for all e∈BLUE
    set $A'_{ij}$=    $A_{ij}-\min_R$ when (i, j) RED
                    $A_{ij}+\min_R$ when (i, j) BLUE
                    $A_{ij}$    other
    new_util=Σ utility of A'
    if new_util<=org_util, continue
    set $A_{ij}$=    $A_{ij}+\min_B$ when (i, j) RED
                   $A_{ij}-\min_B$ when (i, j) BLUE
                 $A_{ij}$    other
end while From the pseudo code, in the IVSCD algorithm according to the embodiment, 'while' loops are performed totally n×m times and 'for' loops are performed totally n×m times every time the 'while' loop is performed. Therefore, time complexity may be $O(n^2m^2)$.

A simulation for evaluating the IVSCD is implemented through coding using C++. The number n of users may be randomly selected from 100, 200, 300, ..., 1000. The number m of resources may be randomly selected from 10, 20, 30, ..., 100.

Elements of the execution time matrix T may be set to rational numbers between 2 and 20. Elements of the expense matrix E may be set to rational numbers between 1 and 10. A number of preventions of resources may be set to be between 0 and (m−1). A probability that each resource is prevented may be set to any one of {0, 0.2, 0.8}. A matrix maximizing a utility deduced by the IVSCD algorithm may be compared with conventional Wei algorithm and Greedy algorithm. Graphs below may show a result of comparing the IVSCD with other algorithms.

Figure 3:
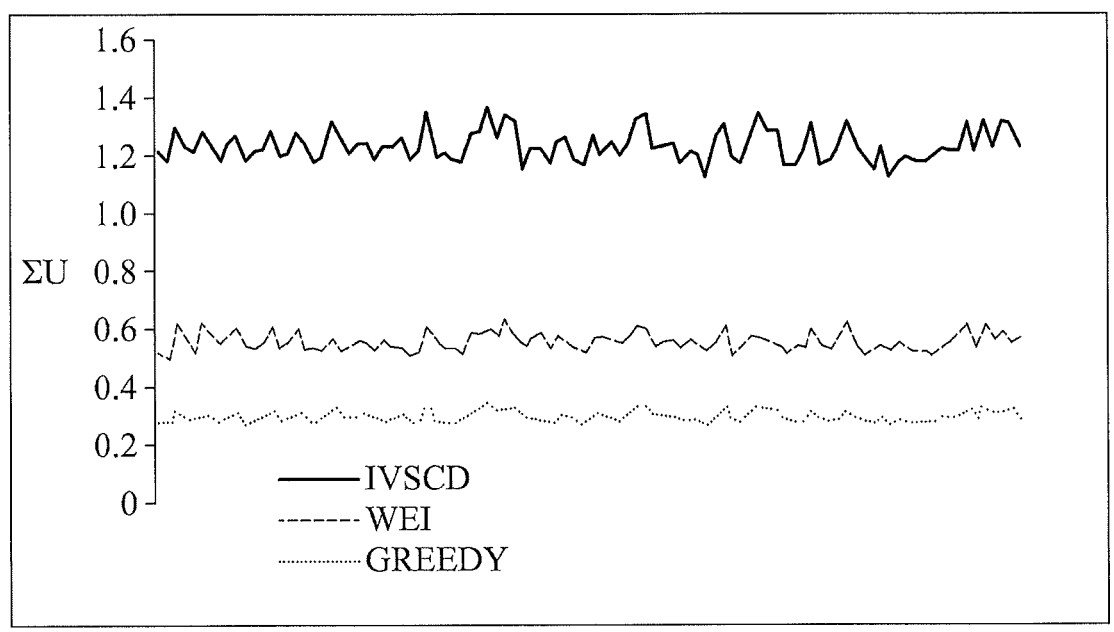
FIG. 3 is a graph illustrating a sum of utilities of a resource allocation device according to an embodiment of the present invention.

FIG. 3 is a graph illustrating a sum of utilities of a resource allocation device according to an embodiment of the present invention. In detail, the graph shows the sum of utilities of the users of when the number of the users is 1000 and the number of the resources is 100.

Here, the utility of the IVSCD algorithm is increased by about 122.07% on the average, about 136.87% maximally, and about 106.56% minimally in comparison to the Wei method. In comparison to the Greedy method, the utility of the IVSCD algorithm is increased by about 310.14% on the average, about 332.85% maximally, and about 287.22% minimally.

Figure 4:
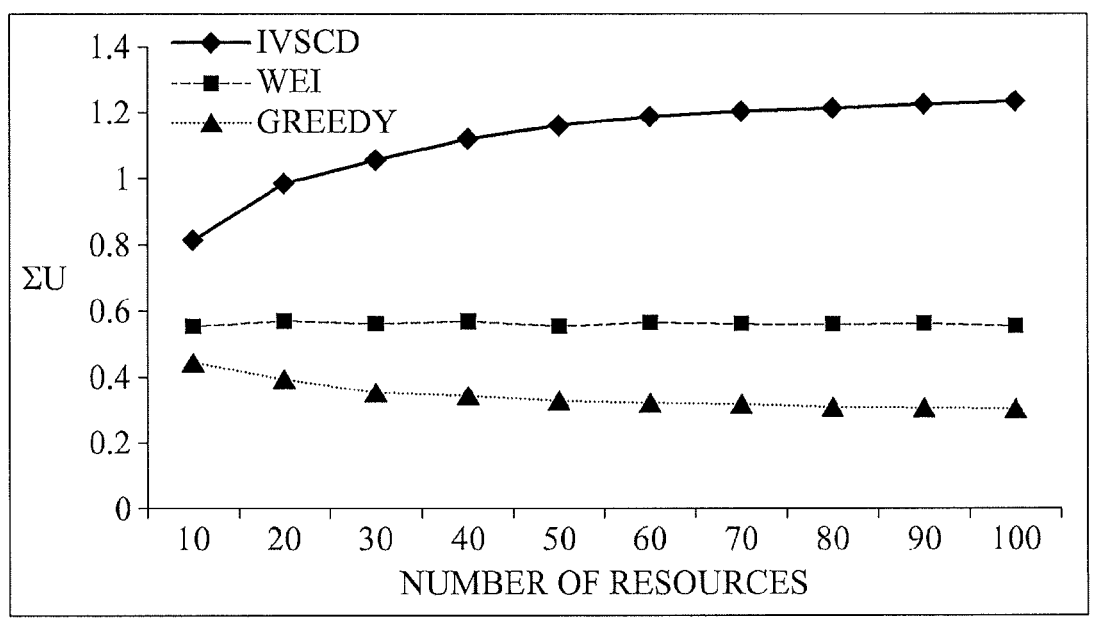
FIG. 4 is a graph comparing a sum of utilities according to resources of a resource allocation device according to an embodiment of the present invention, with a sum of utilities of another method.

FIG. 4 is a graph comparing a sum of utilities according to resources of a resource allocation device according to an embodiment of the present invention, with a sum of utilities of another method. In detail, the graph shows the sum of utilities according to the number of resources of when the number of the users is fixed to 1000.

Here, the utility of the IVSCD algorithm is increased by about 100.46% on the average, about 122.07% maximally, and about 46.58% minimally in comparison to the Wei method. In comparison to the Greedy method, the utility of the IVSCD algorithm is increased by about 229.39% on the average, about 310.14% maximally, and about 82.59% minimally.

Figure 5:
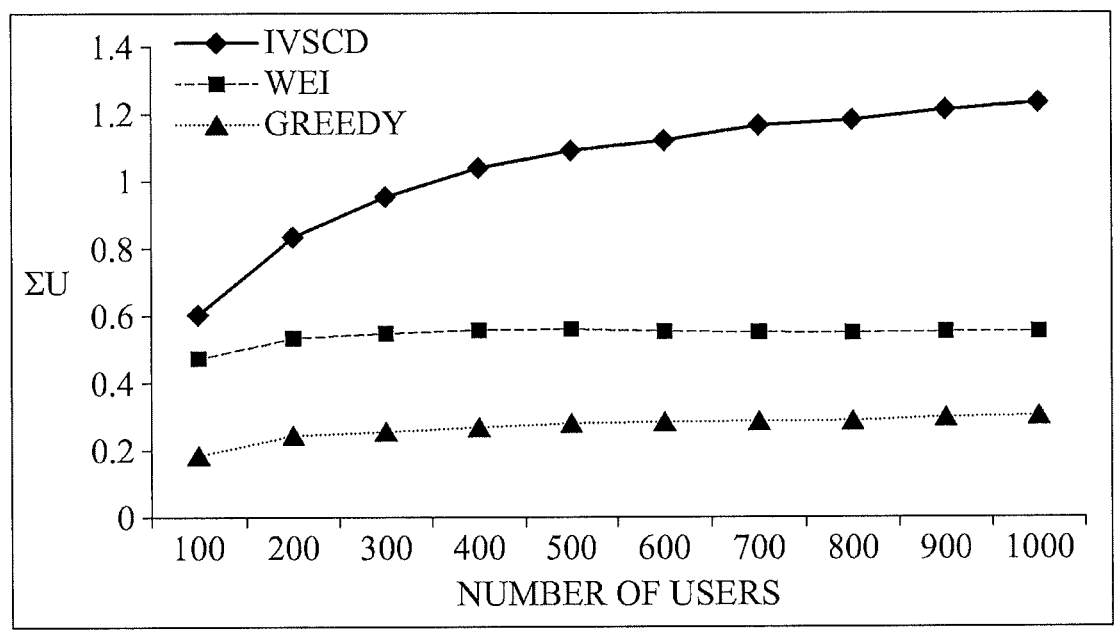
FIG. 5 is a graph comparing a sum of utilities according to a number of users of a resource allocation device according to an embodiment of the present invention, with a sum of utilities of another method.

FIG. 5 is a graph comparing a sum of utilities according to a number of users of a resource allocation device according to an embodiment of the present invention, with a sum of utilities of another method. In detail, the graph shows the sum of utilities according to the number of users of when the number of resources is fixed to 100.

Here, the utility of the IVSCD algorithm is increased by about 91.37% on the average, about 122.07% maximally, and about 28.77% minimally in comparison to the Wei method. In comparison to the Greedy method, the utility of the IVSCD algorithm is increased by about 282.89% on the average, about 310.14% maximally, and about 213.20% minimally.

Figure 6:
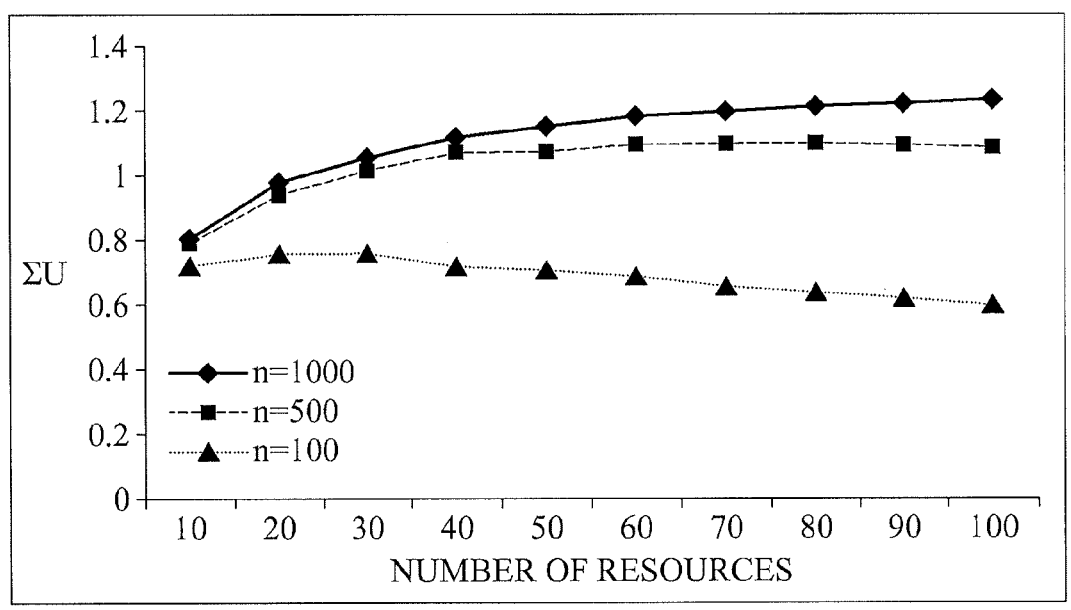
FIG. 6 is a graph illustrating a sum of utilities according to a number of users and a number of resources of a resource allocation device according to an embodiment of the present invention.

FIG. 6 is a graph illustrating a sum of utilities according to a number of users and a number of resources of a resource allocation device according to an embodiment of the present invention. Only the IVSCD algorithm may be shown in the graph.

The graph of FIG. 6 may show a result of simulation in which the number of resources is varied from 10 to 100 and the number of users is 100, 500, and 1000. According to the result of simulation, the increase in the utility the VISCD method may be increased as the number of resources is larger and the number of users is larger.

Figure 7:
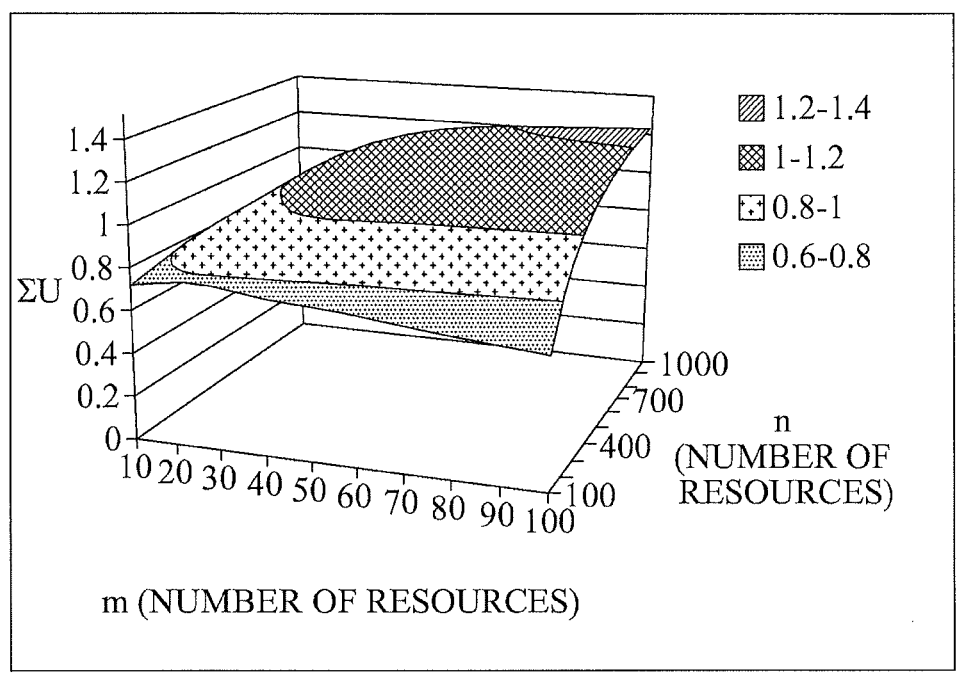
FIG. 7 is a three-dimensional (3D) graph illustrating a sum of utilities according to a number of users and a number of resources of a resource allocation device according to an embodiment of the present invention.
Figure 8:
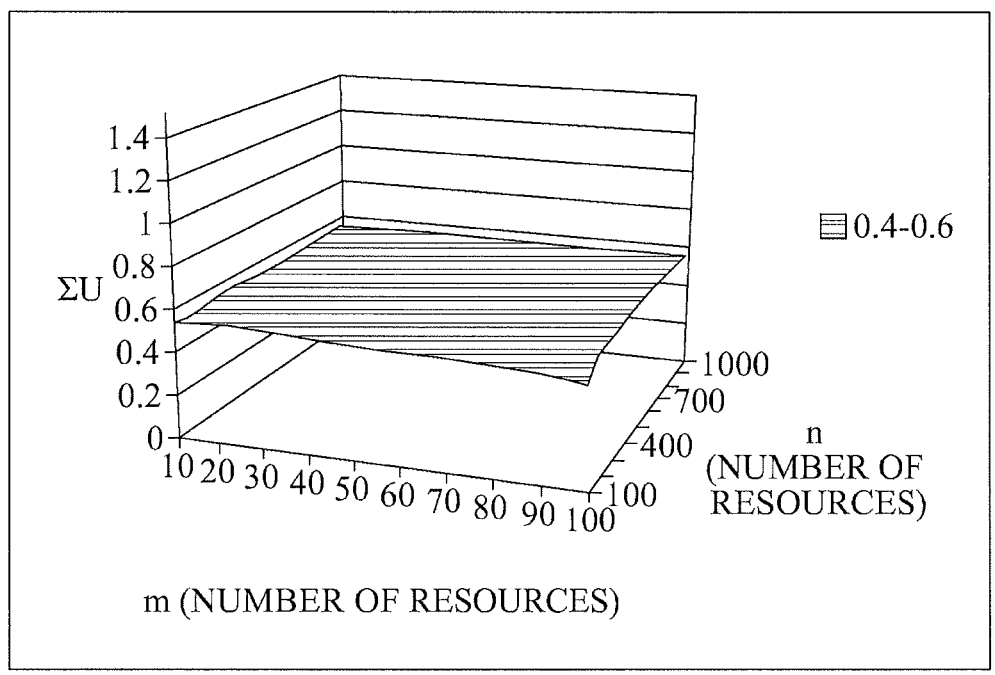
FIG. 8 is a 3D graph illustrating a sum of utilities according to a number of users and a number of resources of a Wei method.

FIG. 7 is a three-dimensional (3D) graph illustrating a sum of utilities according to a number of users and a number of resources of a resource allocation device according to an embodiment of the present invention. FIG. 8 is a 3D graph illustrating a sum of utilities according to a number of users and a number of resources of a Wei method. FIGS. 7 and 8 may be graphs successively showing the utility when the number of resources is changed from 10 to 100 and the number of users is changed from 100 to 1000.

According to FIG. 7 showing a result of simulation related to the IVSCD, since the utility is increased according to an increase in the number of users and the number of resources, the graph may be convex upward. Conversely, according to FIG. 8 showing a result of simulation related to the Wei method, the graph may be plan irrespective of the number of users and the number of resources. According to the simulation result, the IVSCD algorithm may increase the resource allocation efficiency more than other algorithms as the number of users or the number of resources is increased.

A resource allocation device for cloud computing, according to an embodiment, may use the IVSCD algorithm that efficiently allocates resources to users who need the resources, thereby increasing utility of the users. In the IVSCD algorithm different from other conventional algorithms which allocate tasks related to a resource of which an execution time is maximum to another resource, an allocation matrix may be changed to a graph. Therefore, a cycle may be deleted.

According to an embodiment, as a result of simulation, the utility of the IVSCD used in the resource allocation device for cloud computing may be increased by about 46.58% minimally and about 93.87% on the average when the number of users ranges from 50 to 100, in comparison to a conventional heuristic method for ALLOC problem.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical

What is claimed is:

1. A system, comprising:
   a plurality of network computing resources;
   a resource information collecting unit to collect information on tasks to be processed and the network computing resources; and
   a resource allocation unit that:
   sets an initial allocation matrix for processing the tasks;
   generates a graph including edge connecting elements of the initial allocation matrix;
   generates a final allocation matrix by performing cycle deletion with respect to the graph; and
   allocates the tasks to the resources based on the final allocation matrix,
   wherein the network computing resources process the tasks according to the final allocation matrix.

2. The system of claim 1, wherein the resource allocation unit generates the final allocation matrix such that a sum of the utilities of the final allocation matrix is larger than a sum of utilities of the initial allocation matrix, wherein the utilities are determined based on an expense and execution time required for processing the tasks.

3. The system of claim 2, wherein the resource allocation unit sets the initial allocation matrix by arranging the tasks in an order of a number of subtasks included in each of the tasks.

4. The system of claim 2, wherein the resource allocation unit sets the initial allocation matrix so that a number of sharing the resources is minimized.

5. The system of claim 1, wherein the resource allocation unit determines an initial execution time for processing the tasks according to the initial allocation matrix and generates the final allocation matrix such that expenses consumed by the resources are minimized and a final execution time for processing the tasks according to the final allocation matrix is less than or equal to the initial execution time.

6. The system of claim 2, wherein the cycle deletion comprises deleting one or more cycles included in the graph.

7. The system of claim 6, wherein the resource allocation unit colors the edge with a different color from edge not neighboring edges according to the task.

8. The system of claim 1, wherein the information on the resources comprises information on a price of each resources including a necessary expense per unit time needed to use the resources.

9. The system of claim 1, wherein the resource allocation unit prevents allocation of a resource not meeting a condition of the task.

10. The system of claim 2, wherein the utility refers to a minimized expense and execution time required for processing the task.

11. A computer-implemented method of allocating network computing resources to process tasks, the method comprising:
    collecting information on the tasks to be processed and the network computing resources available to process the tasks;
    setting an initial allocation matrix by arranging the tasks in an order of a number of subtasks included in each of the tasks and setting the initial allocation matrix to minimize the sharing of resources;
    generating a graph including edge connecting elements of the initial allocation matrix;
    generating a final allocation matrix by performing cycle deletion with respect to the graph; and
    processing the tasks, by the network computing resources, based on the final allocation matrix.

12. The method of claim 11, wherein generating the final allocation matrix comprises generating the final allocation matrix such that a sum of the utilities of the final allocation matrix is larger than a sum of utilities of the initial allocation matrix, the utilities determined based on an expense and execution time required for processing the tasks.

13. The method of claim 12, wherein the utility refers to a minimized expense and execution time required for processing the task.

14. The method claim 11, further comprising:
    determining an initial execution time for processing the tasks according to the initial allocation matrix,
    wherein generating the final allocation matrix comprises generating the final allocation matrix such that expenses consumed by the resources are minimized and a final execution time for processing the tasks according to the final allocation matrix is less than or equal to the initial execution time.

15. The method of claim 11, wherein the cycle deletion comprises deleting one or more cycles included in the graph.

16. The method of claim 11, wherein the generating a final allocation matrix comprises:
    searching the graph for a cycle, and deleting the searched cycle from the graph.

17. The method of claim 16, wherein two groups of elements in the initial allocation matrix are classified based on a column and a row of each element, included in the cycle, in the initial allocation matrix; and
    wherein the deleting comprises:
    calculating an allocation matrix by adding a minimum value of a group for each element of a corresponding group in the initial allocation matrix or subtracting a minimum value of a group from each element of a corresponding group in the initial allocation matrix.

18. The method of claim 16, wherein the generating of a final allocation matrix further comprises:
    generating the final allocation matrix by repeating the searching and the deleting until no cycles are found.

19. The method of claim 11, wherein the generating of the graph comprises:
    determining each column of the initial allocation matrix to be vertex of the graph; and
    generating edges by connecting between a leftmost element having a value greater than 0 and other elements having value greater than 0 in each row.

20. The method of claim 19, wherein the generating of the graph further comprises:

coloring each of the edges with a color corresponding to each row of the initial allocation matrix.

* * * * *